United States Patent [19]
Yabe

[11] Patent Number: 6,050,376
[45] Date of Patent: Apr. 18, 2000

[54] DAMPER APPARATUS FOR A TORQUE CONVERTER

[75] Inventor: Hiroshi Yabe, Kakegawa, Japan

[73] Assignee: NSK-Warner K.K., Tokyo, Japan

[21] Appl. No.: 08/697,459

[22] Filed: Aug. 23, 1996

[30] Foreign Application Priority Data

Aug. 24, 1995 [JP] Japan .................................... 7-216108

[51] Int. Cl.⁷ ............................. F16D 33/18; F16H 39/00
[52] U.S. Cl. ................... 192/3.29; 192/213.1; 192/213.2
[58] Field of Search ................................. 192/3.28, 3.29, 192/3.3, 213.1, 213.2; 464/66, 68

[56] References Cited

U.S. PATENT DOCUMENTS

| | | | |
|---|---|---|---|
| 4,716,998 | 1/1988 | Tsakamoto et al. | 192/213.1 X |
| 5,080,215 | 1/1992 | Forster et al. | 192/213.1 X |
| 5,246,399 | 9/1993 | Yanko et al. | 192/213.1 X |
| 5,456,343 | 10/1995 | Murata et al. | 192/3.29 |

FOREIGN PATENT DOCUMENTS 3-194247   8/1991   Japan .

*Primary Examiner*—Rodney H. Bonck
*Assistant Examiner*—Saúl Rodríguez
*Attorney, Agent, or Firm*—Vorys, Sater, Seymour and Pease LLP

[57] ABSTRACT

A damper apparatus for a torque converter having a lock-up mechanism provided with a direct-coupled clutch displaceable between a joined state and a liberated state, and a torque converter body for transmitting power by a fluid, comprises a reaction ring movably fitted to an input piston of the direct-coupled clutch, a clutch plate attached to an output turbine hub on an inner diameter side of the reaction ring, and a pair of retainer plates for holding the reaction ring and the clutch plate and also sandwiching an inner peripheral spring and an outer peripheral spring therebetween. The inner and outer peripheral springs are held in corresponding windows of the retainer plates, and they are constructed and arranged to operate serially. The reaction ring and one of the retainer plates are provided with a first cooperative arrangement including a first window portion and a first projection disposed between end portions of the first window portion so as to limit relative movement of the reaction ring and the one retainer plate. The clutch plate and the other retainer plate are provided with a second cooperative arrangement including a second window portion and a second projection disposed between end portions of the second window portion so as to limit relative movement of the clutch plate and the other retainer plate.

6 Claims, 3 Drawing Sheets

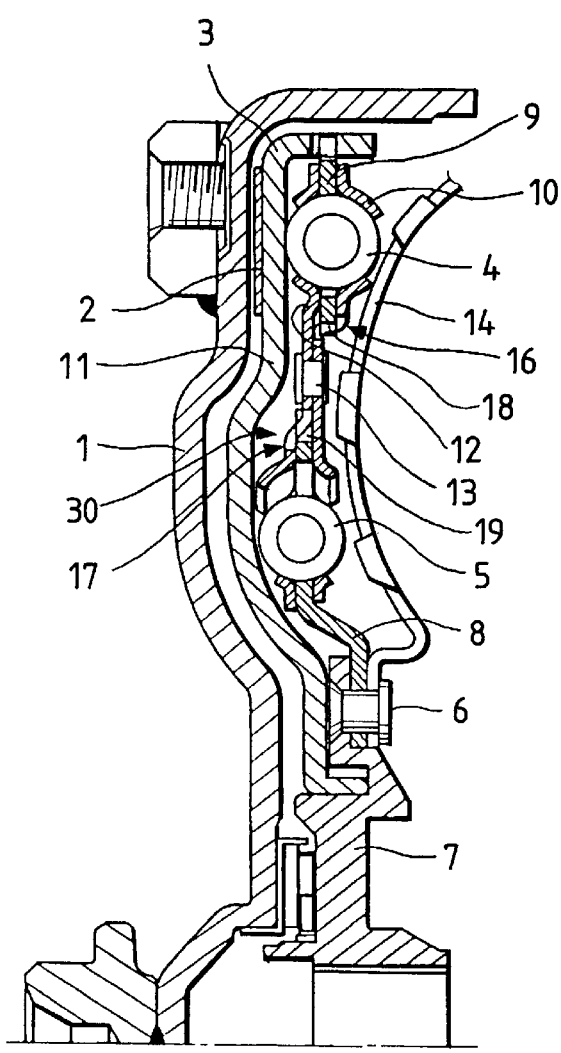
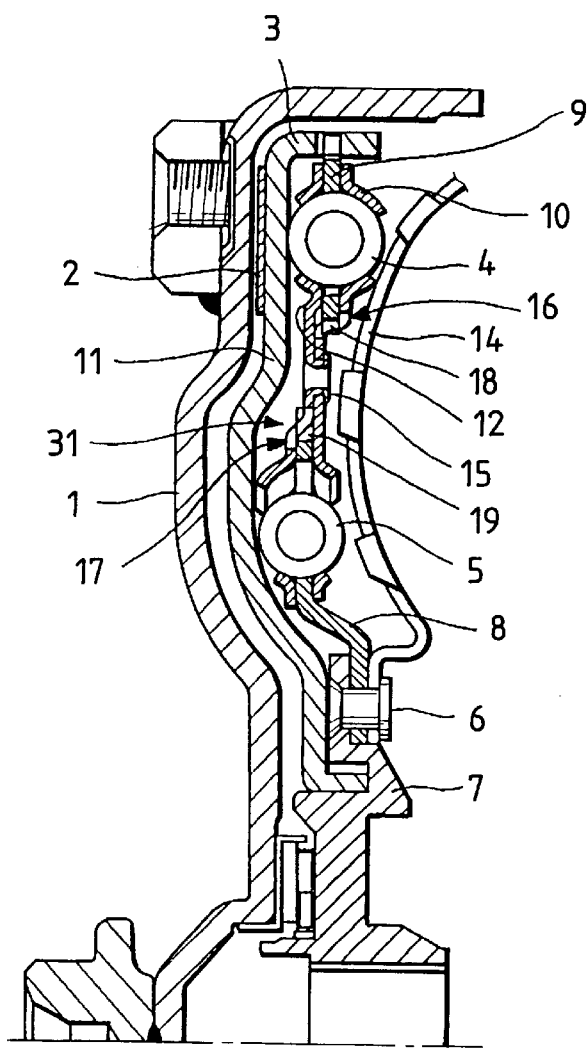

DAMPER APPARATUS FOR A TORQUE CONVERTER

BACKGROUND OF THE INVENTION

1. Field of the Invention

This invention relates to a damper apparatus for absorbing a sudden torque fluctuation in a torque converter with a lock-up mechanism in an automatic transmission for a vehicle, and more particularly to a damper apparatus in which the angle of torsion can be secured greatly by a simple construction and the life of a spring is improved.

2. Related Background Art

Generally, a torque converter transmits power through a fluid and therefore can realize smooth running, although it suffers from the disadvantage that fuel consumption is increased by the energy loss due to the slip of the fluid. In order to solve this, the latest torque converters are provided with a lock-up mechanism.

The lock-up mechanism is a mechanism which comprises a direct-coupled clutch (lock-up clutch) having a frictional surface and in which, when the speed of a vehicle reaches a predetermined speed or higher, the flow of the fluid in the torque converter automatically changes and urges the frictional surface of the piston of the direct-coupled clutch against the front cover of the torque converter to thereby directly couple an engine and drive wheels together. Thereby the influence of the slip of the fluid is eliminated and an improvement in fuel consumption can be achieved.

In such a torque converter, a sudden torque fluctuation occurs when the piston (lock-up piston) of the direct-coupled clutch is displaced between the joined state and the liberated state thereof with respect to the front cover of the torque converter. In order to absorb this torque fluctuation, there is provided a damper apparatus comprising a plurality of springs.

Usually, a damper apparatus in which springs are disposed on the inner and outer peripheries and are serially operated is exposed to the sudden torque fluctuations of these springs and an excessively great change in stress each time the direct-coupled clutch is connected and disconnected. Therefore, it has often been the case that the service life is reduced.

Heretofore, in order to prevent an excessively great torque from being applied to the springs, provision has been made of means for limiting the stroke of the springs. For example, in U.S. Pat. No. 5,246,399, a ring member is interposed in the intermediate portion of the damper apparatus to limit the angles of the inner and outer peripheral springs.

Also, in Japanese Patent Application Laid-Open No. 3-194247, the angle of the outer peripheral spring is limited by a cut-away portion provided on the outer side of an outer peripheral plate and the angle of the inner peripheral spring is limited by an inner side plate and the spacer of a rivet.

In the above-described prior-art damper apparatuses, however, the use of the ring member or the spacer of the rivet leads to an increased number of parts. Also, the width dimension of the rivet portion becomes great and there occurs interference friction resulting from increased weight or axial cumulative dimension, and it is necessary to make the dimensional accuracy of materials very precise in order to prevent backlash. Further, it is necessary to apply expensive heat treatment to the angle limiting portion in order to prevent abrasion due to vibration in a rotational direction.

SUMMARY OF THE INVENTION

Accordingly, it is an object of the present invention to provide a damper apparatus for a torque converter with a lock-up mechanism in which the number of parts is decreased and the twist angles of inner peripheral and outer peripheral springs can be limited, so that the life of the springs can be improved and also any excessively great load can be prevented from being applied to the inner peripheral and outer peripheral springs.

To achieve the above object, the present invention provides a damper apparatus for a torque converter having a lock-up mechanism provided with a direct-coupled clutch displaceable between a joined state and a liberated state, and a torque converter body for transmitting power by a fluid, comprising:

a reaction ring movably fitted to an input piston of the direct-coupled clutch;

a clutch plate attached to an output turbine hub on an inner diameter side of the reaction ring; and a pair of retainer plates for holding the reaction ring and the clutch plate and also sandwiching an inner peripheral spring and an outer peripheral spring therebetween, the inner and outer peripheral springs being held in corresponding windows of the retainer plates;

wherein the inner and outer peripheral springs are constructed and arranged to operate in series, the reaction ring and one of the retainer plates are provided with a first cooperative arrangement including a first window portion and a first projection disposed between end portions of the first window portion so as to limit relative movement of the reaction ring and the one retainer plate, and the clutch plate and the other retainer plate are provided with a second cooperative arrangement including a second window portion and a second projection disposed between end portions of the second window portion so as to limit relative movement of the clutch plate and the other retainer plate.

According to one of its preferred modes the present invention provide a damper apparatus for a torque converter having a lock-up mechanism provided with a direct-coupled clutch displaceable between a joined state and a liberated state, and a torque converter body for transmitting power by a fluid, comprising:

a reaction ring axially movably fitted to the input piston of the direct-coupled clutch and having a projection on the inner diameter portion thereof;

a clutch plate fixed to an output turbine hub on the inner diameter side of the reaction ring and having a projection on the outer diameter portion thereof;

a pair of retainer plates for holding the reaction ring and the clutch plate and also sandwiching an inner peripheral spring and an outer peripheral spring therebetween, the springs being held in corresponding windows of the retainer plates; and window portions provided in the pair of retainer plates;

the projection of the reaction ring being disposed between the end portions of one of the window portions to thereby limit the relative movement of the reaction ring and the retainer plates, and the projection of the clutch plate being disposed between the end portions of the other of the window portions to thereby limit the relative movement of the clutch plate and the retainer plates.

The projection on the inner diameter surface of the reaction ring comes into engagement with an end portion of the window portion of one of the retainer plates to thereby provide the limitation of the angle of the outer peripheral spring, and the clutch plate comes into engagement with an end portion of the window portion of the other retainer plate to thereby provide the limitation of the angle of the inner peripheral spring.

BRIEF DESCRIPTION OF THE DRAWINGS

FIG. 1 is an axial cross-sectional view of a first embodiment of the present invention.

FIG. 2 is an axial cross-sectional view of a second embodiment of the present invention.

DESCRIPTION OF THE PREFERRED EMBODIMENTS

Figure 3:
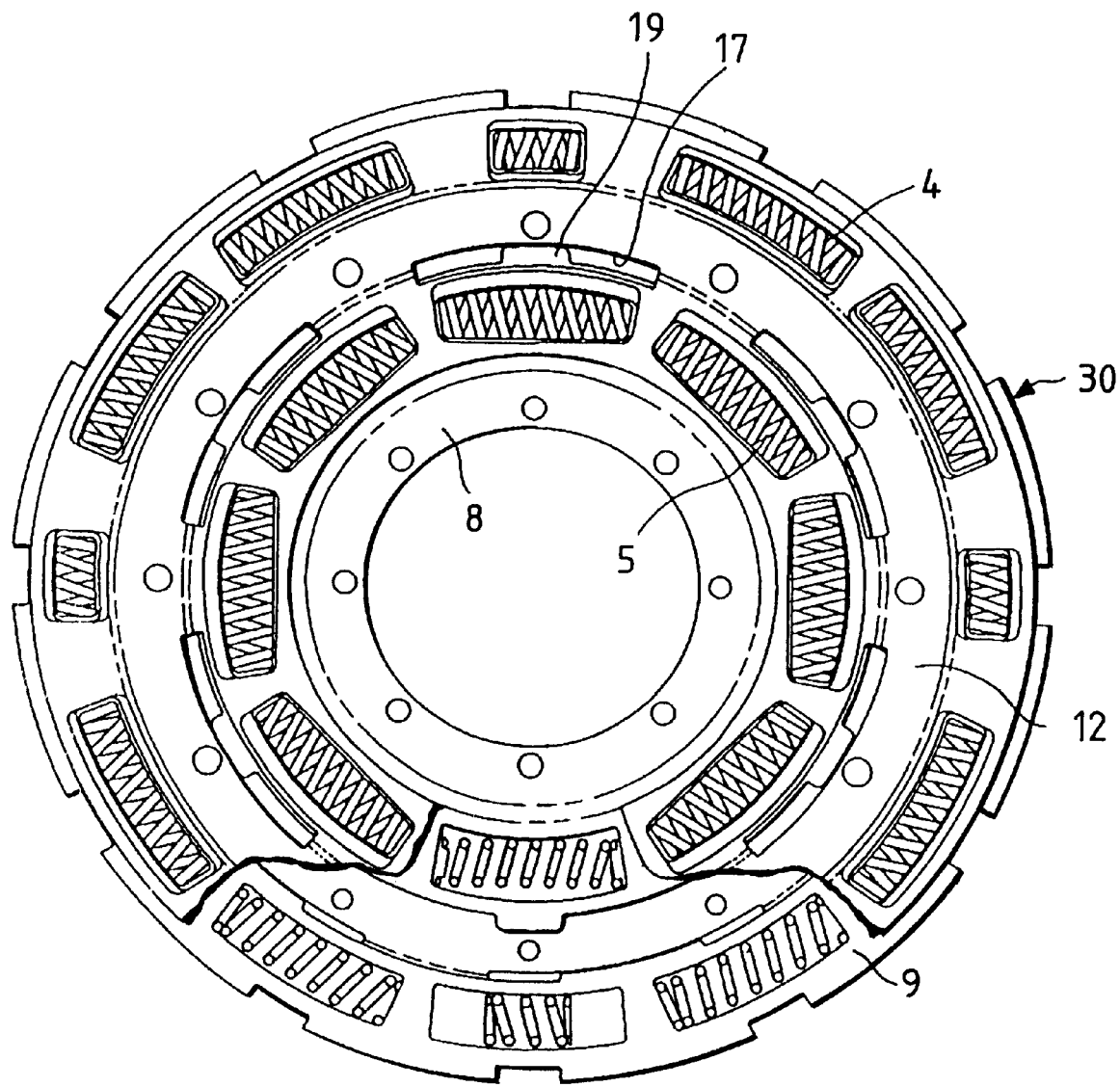
FIG. 3 is a front view of the damper apparatus of FIG. 1 as it is seen from the left thereof.

The present invention will hereinafter be described in detail with reference to the drawings. Of course, the embodiments hereinafter described are illustrative of the present invention and do not restrict the present invention. Also, the same portions in the drawings are designated by the same reference numerals.

FIG. 1 is an axial fragmentary cross-sectional view of a torque converter, and shows a damper apparatus according to a first embodiment of the present invention. FIG. 1 shows the liberated state of a direct-coupled clutch.

The damper apparatus 30 comprises a reaction ring 9 axially movably fitted at the outer periphery thereof to the flange portion of an input piston, i.e., a lock-up piston 11, a clutch plate 8 fixed to a turbine hub 7 by a rivet 6, a pair of retainer plates, i.e., an inner retainer plate 10 and an outer retainer plate 12, sandwiching the reaction ring 9 and the clutch plate 8 therebetween, and a plurality of inner peripheral springs 5 and outer peripheral springs 4 mounted in series in window portions of the inner and outer retainer plates 10 and 12.

A frictional material 2 is attached to the outer surface of the lock-up piston 11, and when the lock-up piston 11 axially slides and bears against the inner surface of a front cover 1, the lock-up piston 11 and the front cover 1 come into close contact with each other with the frictional material 2 interposed therebetween and provide a joined state, and the transmission of torque is effected with the two directly coupled together.

A turbine runner 14 which is the output member of the torque converter portion is fixed to the turbine hub 7 by the rivet 6. Also, the inner retainer plate 10 and the outer retainer plate 12 are fixed to each other between an outer peripheral spring 4 and an inner peripheral spring 5 by a rivet 13.

The inner retainer plate 10 is provided with a stepped window portion 16, and the outer retainer plate 12 is provided with a stepped window portion 17. Also, a radially inwardly protruding projection 18 is provided on the inner peripheral portion of the reaction ring 9, and a radially outwardly protruding projection 19 is provided on the outer peripheral portion of the clutch plate 8.

FIG. 2 is an axial fragmentary cross-sectional view of a torque converter similar to that of FIG. 1, and shows a damper apparatus 31 according to a second embodiment of the present invention. Like FIG. 1, FIG. 2 also shows the liberated state of a direct-coupled clutch. The second embodiment differs from the first embodiment only in the method of fixing the inner retainer plate 10 and the outer retainer plate 12. In the second embodiment, no rivet is used. Instead a projected portion 15 is provided on the outer retainer plate 12, and after it is fitted into the aperture portion of the inner retainer plate 10, the projected portion 15 is caulked in the aperture portion and the two are fixed to each other, thus making a rivet unnecessary. A projected portion may be provided on the inner retainer plate 10 and be caulked in the aperture portion of the outer retainer plate 12.

FIG. 3 is a front view of the damper apparatus 30 as it is seen from the left thereof in FIG. 1, and shows the relation between the projection 19 of the clutch plate 8 and the window portion 17 of the outer retainer plate 12. As is apparent from FIG. 3, the projection 19 of the clutch plate 8 is movable within the range of the circumferential width of the window portion 17. The projection 19 abuts with the circumferentially opposite end portions of the window portion 17, whereby the relative movement thereof is limited and the flexure (stroke) angle of the inner peripheral springs 5 is limited to a range within which the projection 19 can move, i.e., a predetermined angle corresponding to the circumferential width of the window portion 17. Accordingly, an excessively great load can be prevented from being applied to the inner peripheral springs 5.

Figure 5:
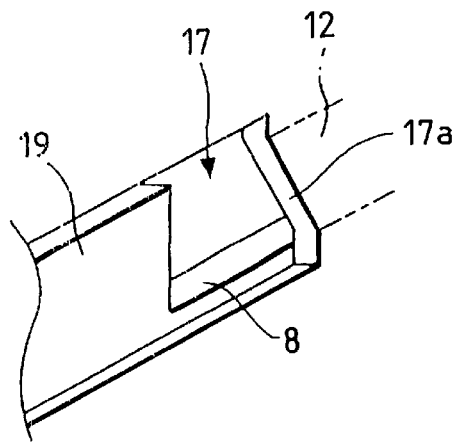
FIG. 5 is a fragmentary perspective view showing the relation between the projection of a clutch plate and the window portion of an inner retainer plate.

As shown in FIG. 5, the projection 19 of the clutch plate 8 abuts against the stepped portion 17a of the window portion 17 provided in the outer retainer plate 12, whereby the movement thereof is regulated.

Figure 4:
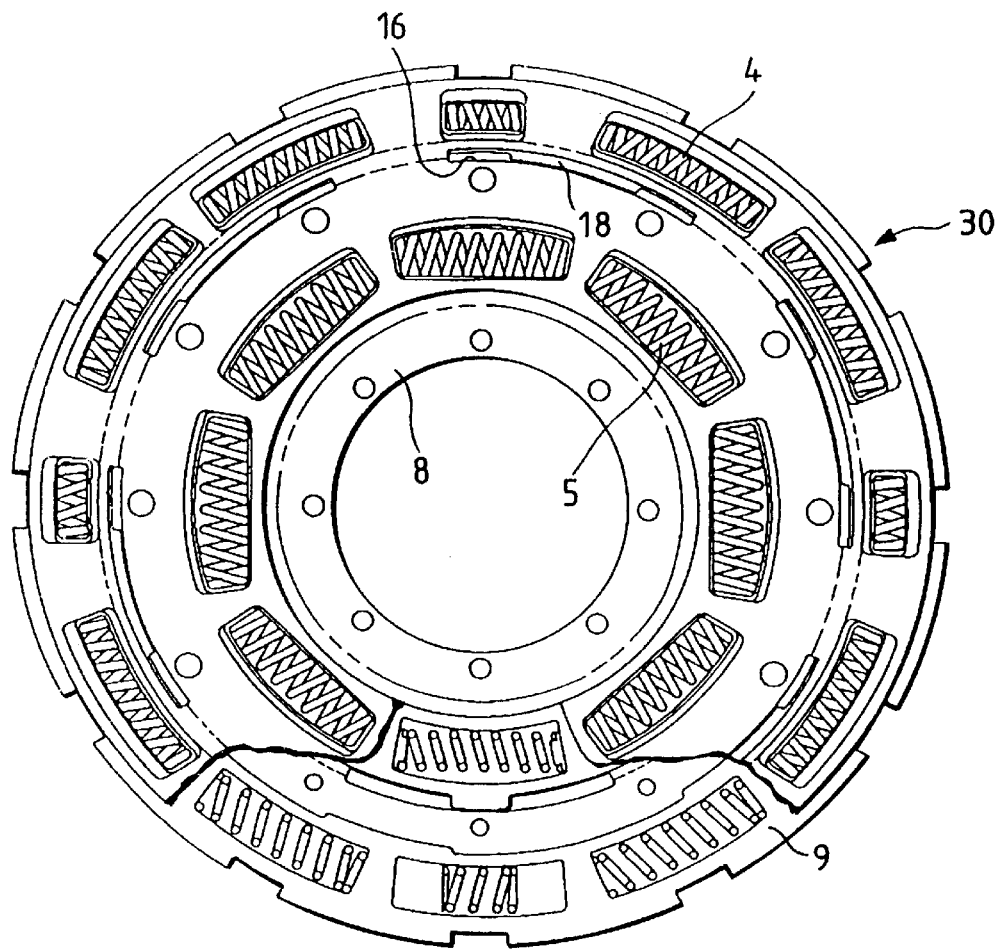
FIG. 4 is a front view of the damper apparatus of FIG. 1 as it is seen from the right thereof.

FIG. 4 is a front view of the damper apparatus 30 as it is seen from the right thereof in FIG. 1, and shows the relation between the projection 18 of the reaction ring 9 and the window portion 16 of the inner retainer plate 10. As is apparent from FIG. 4, the projection 18 of the reaction ring 9 is movable within the range of the circumferential width of the window portion 16. The projection 18 abuts against the circumferentially opposite end portions of the window portion 16, whereby the relative movement thereof is limited and the flexure (stroke) angle of the outer peripheral springs 5 is limited to a range within which the projection 18 can move, i.e., a predetermined angle corresponding to the circumferential width of the window portion 16. Accordingly, an excessively great load can be prevented from being applied to the outer peripheral springs 5.

Figure 6:
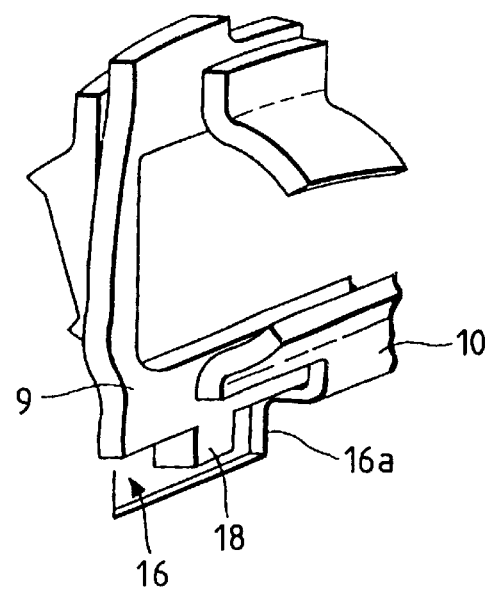
FIG. 6 is a fragmentary perspective view showing the relation between the projection of a reaction ring and the window portion of an outer retainer plate.

As shown in FIG. 6, the projection 18 of the reaction ring 9 abuts against the stepped portion 16a of the window portion 16 provided in the inner retainer plate 10, whereby the movement thereof is regulated.

As described above, in the embodiments of the present invention, the inner peripheral and outer peripheral springs serially operate and the outer peripheral springs 4 smaller in spring constant are earlier twisted up to an angle limiting portion (the stepped portion 16a of the window portion 16 of the inner retainer plate 10), whereafter the inner peripheral springs 5 greater in spring constant are twisted up to an angle limiting portion (the stepped portion 17a of the window portion 17 of the outer retainer plate 12). That is, the route of torque transmission is the lock-up piston 11 (input side)→the reaction ring 9→the outer peripheral springs 4→the inner and outer retainer plates 10 and 12→the inner peripheral springs 5→the clutch plate 8→the turbine hub (output side).

According to the embodiments present invention described above, there are obtained the following effects.

(1) The projection on the inner diameter surface of the reaction ring and the end portion of the window portion of one of the retainer plates are engaged with each other to thereby provide the limitation of the angle of the outer peripheral springs, and the clutch plate and the end portion of the window portion of the other retainer plate are engaged with each other to thereby provide the limitation of the angle of the inner peripheral springs. Accordingly, an excessively great load is not applied to the inner peripheral and outer peripheral springs and an improvement in the life of the springs can be achieved.

(2) An additional member is not required and therefore, the number of parts can be decreased and the costs can be curtailed.

(3) The apparatus can be designed more compactly in the axial direction thereof and therefore, the entire apparatus can be made lighter in weight.

(4) The prevention of the interference and backlash by any change in the axial cumulative dimension is possible.

(5) The reaction ring and the clutch plate can be provided from one and the same plate and therefore, the costs of materials can be curtailed.

What is claimed is:

1. A damper apparatus for a torque converter having a lock-up mechanism provided with a direct-coupled clutch displaceable between a joined state and a liberated state, and a torque converter body for transmitting power by a fluid, comprising:

a reaction ring axially movably fitted to an input piston of said direct-coupled clutch and having a projection on an inner diameter portion thereof;

a clutch plate fixed to an output turbine hub on an inner diameter side of said reaction ring, said clutch plate having a projection on an outer diameter portion thereof;

a pair of retainer plates for holding said reaction ring and said clutch plate and also sandwiching an inner peripheral spring and an outer peripheral spring therebetween, said inner and outer peripheral springs being held in corresponding windows of said retainer plates; and a respective window portion provided in each of said pair of retainer plates;

wherein said inner and outer peripheral springs are constructed and arranged to operate serially, the projection of said reaction ring is disposed between end portions of the window portion of one of said retainer plates so as to limit relative movement of said reaction ring and said retainer plates, and the projection of said clutch plate is disposed between end portions of the window portion of the other of said retainer plates so as to limit relative movement of said clutch plate and said retainer plates.

2. A damper apparatus according to claim 1, wherein a projection is provided on one of said pair of retainer plates, an aperture portion is provided in the other retainer plate, and said projection is fitted in and fixed to said aperture portion such that said pair of retainer plates are fixed to each other.

3. A damper apparatus for a torque converter having a lock-up mechanism provided with a direct-coupled clutch displaceable between a joined state and a liberated state, and a torque converter body for transmitting power by a fluid, comprising:

a reaction ring movably fitted to an input piston of said direct-coupled clutch;

a clutch plate attached to an output turbine hub on an inner diameter side of said reaction ring; and a pair of retainer plates for holding said reaction ring and said clutch plate and also sandwiching an inner peripheral spring and an outer peripheral spring therebetween, the inner and outer peripheral springs being held in corresponding windows of said retainer plates;

wherein said inner and outer peripheral springs are constructed and arranged to operate serially, said reaction ring and one of said retainer plates are provided with a first cooperative arrangement including a first window portion and a first projection disposed between end portions of said first window portion so as to limit relative movement of said reaction ring and said one retainer plate, and said clutch plate and the other of said retainer plates are provided with a second cooperative arrangement including a second window portion and a second projection disposed between end portions of said second window portion so as to limit relative movement of said clutch plate and said other retainer plate.

4. A damper apparatus according to claim 3, wherein said pair of retainer plates are fixed to each other.

5. A damper apparatus according to claim 3, wherein a projection is provided on one of said pair of retainer plates, an aperture portion is provided in the other retainer plate, and said projection is fitted in and fixed to said aperture portion such that said pair of retainer plates are fixed to each other.

6. A damper apparatus according to claim 1, wherein said pair of retainer plates are fixed to each other.

* * * * *